US007756707B2

(12) United States Patent
Garner et al.

(10) Patent No.: US 7,756,707 B2
(45) Date of Patent: Jul. 13, 2010

(54) SIGNAL PROCESSING APPARATUS AND METHOD

(75) Inventors: Philip Garner, Tokyo (JP); Toshiaki Fukada, Kanagawa (JP); Yasuhiro Komori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1179 days.

(21) Appl. No.: 11/082,931

(22) Filed: Mar. 18, 2005

(65) Prior Publication Data

US 2005/0216261 A1 Sep. 29, 2005

(30) Foreign Application Priority Data

Mar. 26, 2004 (JP) ............................ 2004-093166

(51) Int. Cl.
*G10L 15/20* (2006.01)

(52) U.S. Cl. ..................................................... 704/233

(58) Field of Classification Search .................. 704/233
See application file for complete search history.

(56) References Cited

U.S. PATENT DOCUMENTS 4,281,218 A 7/1981 Chuang et al.
4,696,039 A 9/1987 Doddington
5,579,431 A 11/1996 Reaves
5,745,650 A 4/1998 Otsuka et al. .............. 395/2.69
5,745,651 A 4/1998 Otsuka et al. .............. 395/2.77
5,787,396 A 7/1998 Komori et al. .............. 704/256
5,797,116 A 8/1998 Yamada et al. ................ 704/10
5,812,975 A 9/1998 Komori et al. .............. 704/256
5,845,047 A 12/1998 Fukada et al. .............. 395/2.77
5,956,679 A 9/1999 Komori et al. .............. 704/256
5,970,445 A 10/1999 Yamamoto et al. .......... 704/230
6,076,061 A 6/2000 Kawasaki et al. ........... 704/270
6,097,820 A * 8/2000 Turner ....................... 381/94.3
6,108,628 A 8/2000 Komori et al. .............. 704/256
6,236,962 B1 5/2001 Kosaka et al. ............... 704/234
6,249,757 B1 6/2001 Cason
6,259,017 B1 7/2001 Takehara et al. ............ 136/293
6,266,636 B1 7/2001 Kosaka et al. ............... 704/244

(Continued)

FOREIGN PATENT DOCUMENTS

JP 60-209799 10/1985

OTHER PUBLICATIONS

Zheng et al., "Robust Endpoint Detection and Energy Normalization for Real-Time Speech and Speaker Recognition," IEEE Transactions on Speech and Audio Processing, vol. 10, No. 3, Mar. 2002, pp. 146-157.

(Continued)

*Primary Examiner*—Michael N Opsasnick
(74) *Attorney, Agent, or Firm*—Fitzpatrick, Cella, Harper & Scinto

(57) ABSTRACT

A signal processing apparatus and method for performing a robust endpoint detection of a signal are provided. An input signal sequence is divided into frames each of which has a predetermined time length. The presence of the signal in the frame is detected. After that, the filter process of smoothing the detection result by using the detection result for a past frame is applied to the detection result for a current frame. The filter output is compared with a predetermined threshold value to determine the state of the signal sequence of the current frame on the basis of the comparison result.

3 Claims, 11 Drawing Sheets

U.S. PATENT DOCUMENTS

| | | | | |
|---|---|---|---|---|
| 6,393,396 | B1 | 5/2002 | Nakagawa et al. | 704/233 |
| 6,415,253 | B1 * | 7/2002 | Johnson | 704/210 |
| 6,453,285 | B1 | 9/2002 | Anderson et al. | |
| 6,480,823 | B1 | 11/2002 | Zhao et al. | |
| 6,662,159 | B2 | 12/2003 | Komori et al. | 704/255 |
| 6,778,960 | B2 | 8/2004 | Fukada | 704/260 |
| 6,801,891 | B2 | 10/2004 | Garner et al. | 704/254 |
| 6,813,606 | B2 | 11/2004 | Ueyama et al. | 704/270.1 |
| 6,826,531 | B2 | 11/2004 | Fukada | 704/258 |
| 6,912,209 | B1 * | 6/2005 | Thi et al. | 370/286 |
| 2001/0032079 | A1 | 10/2001 | Okutani et al. | 704/258 |
| 2001/0047259 | A1 | 11/2001 | Okutani et al. | 704/260 |
| 2002/0049590 | A1 | 4/2002 | Yoshino et al. | 704/241 |
| 2002/0051955 | A1 | 5/2002 | Okutani et al. | 434/185 |
| 2002/0052740 | A1 | 5/2002 | Charlesworth et al. | 704/220 |
| 2003/0158735 | A1 | 8/2003 | Yamada et al. | 704/260 |
| 2004/0076271 | A1 * | 4/2004 | Koistinen et al. | 379/88.11 |
| 2005/0043946 | A1 | 2/2005 | Ueyama et al. | 704/231 |
| 2005/0065795 | A1 | 3/2005 | Mutsuno et al. | 704/260 |

OTHER PUBLICATIONS

Sohn et al., "A Voice Activity Detector Employing Soft Decision Based Noise Spectrum Adaptation," Proceedings of the IEEE International Conference on Acoustics, Speech and Signal Processing, May 1998, pp. 365-368.

Official Communication dated Jan. 12, 2010 issued by the Japanese Patent Office in corresponding Japanese Patent Application No. 2004-094166.

* cited by examiner

SIGNAL PROCESSING APPARATUS AND METHOD

FIELD OF THE INVENTION

The present invention relates generally to a signal processing apparatus and method, and in particular, relates to an apparatus and method for detecting a signal such as an acoustic signal.

BACKGROUND OF THE INVENTION

In the field of, e.g., speech processing, a technique for detecting speech periods is often required. Detection of speech periods is generally referred to as VAD (Voice Activity Detection). Particularly, in the field of speech recognition, a technique for detecting both the beginning point and the ending point of a significant unit of speech such as a word or phrase (referred to as the endpoint detection) is very critical.

FIG. 1 shows an example of a conventional Automatic Speech Recognition (ASR) system including a VAD and an endpoint detection. In FIG. 1, a VAD 22 prevents a speech recognition process in an ASR unit 24 from recognizing background noise as speech. In other words, the VAD 22 has a function of preventing an error of converting noise into a word. Additionally, the VAD 22 makes it possible to more skillfully manage the throughput of the entire system in a general ASR system that utilizes many computer resources. For example, control of a portable device by speech is allowed. More specifically, the VAD distinguishes between a period during which the user does not utter and that during which the user issues a command. As a result, the apparatus can so control as to concentrate on other functions while speech recognition is not in progress and concentrate on ASR while the user utters.

In this example as well, a front-end processing unit 21 on the input of the VAD 22 and a speech recognition unit 24 can be shared by the VAD 22 and the speech recognition unit 24, as shown in FIG. 1. In this example, an endpoint detection unit 23 uses a VAD signal to distinguish between periods between the beginning and ending points of utterances and pauses between words. This is because the speech recognition unit 24 must accept as speech the entire utterance without any gaps.

There exists a large body of prior art in the field of VAD and endpoint detection. The following discussion is limited either to the most representative or most recent.

U.S. Pat. No. 4,696,039 discloses one approach to endpoint detection using a counter to determine the transition from speech to silence. Silence is hence detected after a predetermined time. In contrast, the present invention does not use such a predetermined period to determine state transitions.

U.S. Pat. No. 6,249,757 discloses another approach to end point detection using two filters. However, these filters run on the speech signal itself, not a VAD metric or thresholded signal.

Much prior art uses state machines driven by counting fixed periods: U.S. Pat. No. 6,453,285 discloses a VAD arrangement including a state machine. The machine changes state depending upon several factors, many of which are fixed periods of time. U.S. Pat. No. 4,281,218 is an early example of a state machine effected by counting frames. U.S. Pat. No. 5,579,431 also discloses a state machine driven by a VAD. The transitions again depend upon counting time periods. U.S. Pat. No. 6,480,823 recently disclosed a system containing many thresholds, but the thresholds are on an energy signal.

A state machine and a sequence of thresholds are also described in "Robust endpoint detection and energy normalization for real-time speech and speaker recognition", by Li Zheng, Tsai and Zhou, IEEE transactions on speech and audio processing, Vol. 10, No. 3, March 2002. The state machine, however, still depends upon fixed time periods.

The prior art describes state machine based endpointers that rely on counting frames to determine the starting point and the ending point of speech. For this reason, these endpointers suffer from the following drawbacks:

First, bursts of noise (perhaps caused by wind blowing across a microphone, or footsteps) typically have high energy and are hence determined by the VAD metric to be speech. Such noises, however, yield a boolean (speech or non-speech) decision that rapidly oscillates between speech and non-speech. An actual speech signal tends to yield a boolean decision that indicates speech for a small contiguous number of frames, followed by silence for a small contiguous number of frames. Conventional frame counting techniques cannot in general distinguish these two cases.

Second, when counting silence frames to determine the end of a speech period, a single isolated speech decision can cause the counter to reset. This in turn delays the acknowledgement of the speech to silence transition.

SUMMARY OF THE INVENTION

In view of the above problems in the conventional art, the present invention has an object to provide an improved endpoint detection technique that is robust to noise in the VAD decision.

In one aspect of the present invention, a signal processing apparatus includes dividing means for dividing an input signal into frames each of which has a predetermined time length; detection means for detecting the presence of a signal in the frame; filter means for smoothing a detection result from the detection means by using a detection result from the detection means for a past frame; and state evaluation means for comparing an output from the filter means with a predetermined threshold value to evaluate a state of the signal on the basis of a comparison result.

Other and further objects, features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DETAILED DESCRIPTION OF THE PREFERRED EMBODIMENTS

Preferred embodiments of the present invention will now be described in detail in accordance with the accompanying drawings.

<Terminology>

In the following description, let us clearly distinguish two processes:

1. Voice Activity Detection (VAD) is the process of generating a frame-by-frame or sample-by-sample metric indicating presence or absence of speech. 2. Endpoint detection or Endpointing is the process of determining the beginning and ending points of a word or other semantically meaningful partition of an utterance by means of the VAD metric.

Additionally, note that the terms “noise”, “silence” and “non-speech” are used interchangeably.

<Arrangement of Computer System>

The present invention can be implemented by a general computer system. Although the present invention can also be implemented by dedicated hardware logic, this embodiment is implemented by a computer system.

Figure 1:
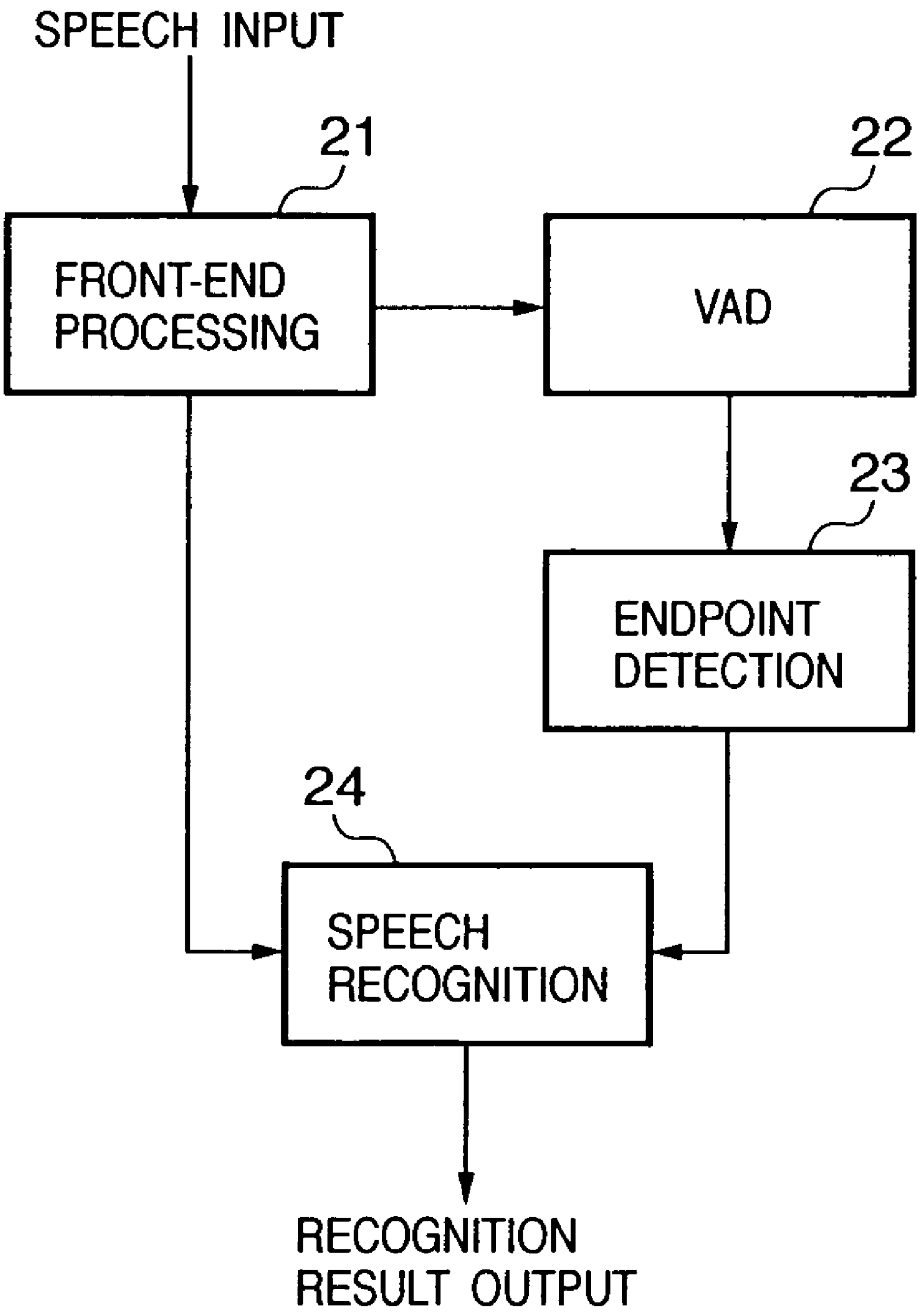
FIG. 1 shows an example of a conventional Automatic Speech Recognition (ASR) system including a VAD and an endpoint detection.
Figure 2:
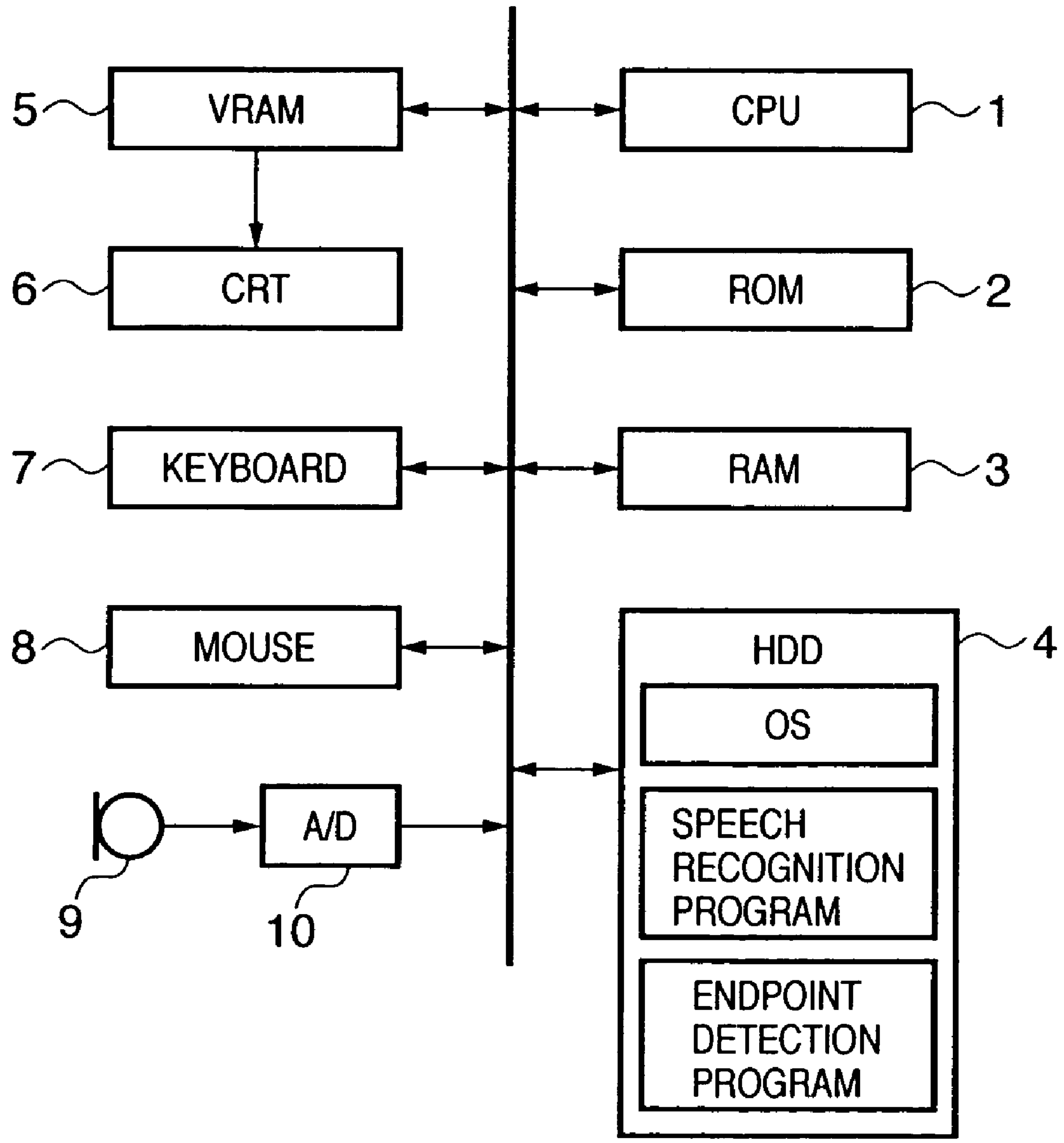
FIG. 2 is a block diagram showing the arrangement of a computer system according to an embodiment of the present invention.

FIG. 2 is a block diagram showing the arrangement of a computer system according to the embodiment. As shown in FIG. 2, the computer system includes the following arrangement in addition to a CPU 1, which controls the entire system, a ROM 2, which stores a boot program and the like, and a RAM 3, which functions as a main memory.

An HDD 4 is a hard disk unit and stores an OS, a speech recognition program, and an endpoint detection program that operates upon being called by the speech recognition program. For example, if the computer system is incorporated in another device, these programs may be stored not in the HDD but in the ROM 2. A VRAM 5 is a memory onto which image data to be displayed is rasterized. By rasterizing image data and the like onto the memory, the image data can be displayed on a CRT 6. Reference numerals 7 and 8 denote a keyboard and mouse, respectively, serving as input devices. Reference numeral 9 denotes a microphone for inputting speech; and 10, an analog to digital (A/D) converter that converts a signal from the microphone 9 into a digital signal.

<Functional Arrangement of Endpoint Detection Program>

Figure 3:
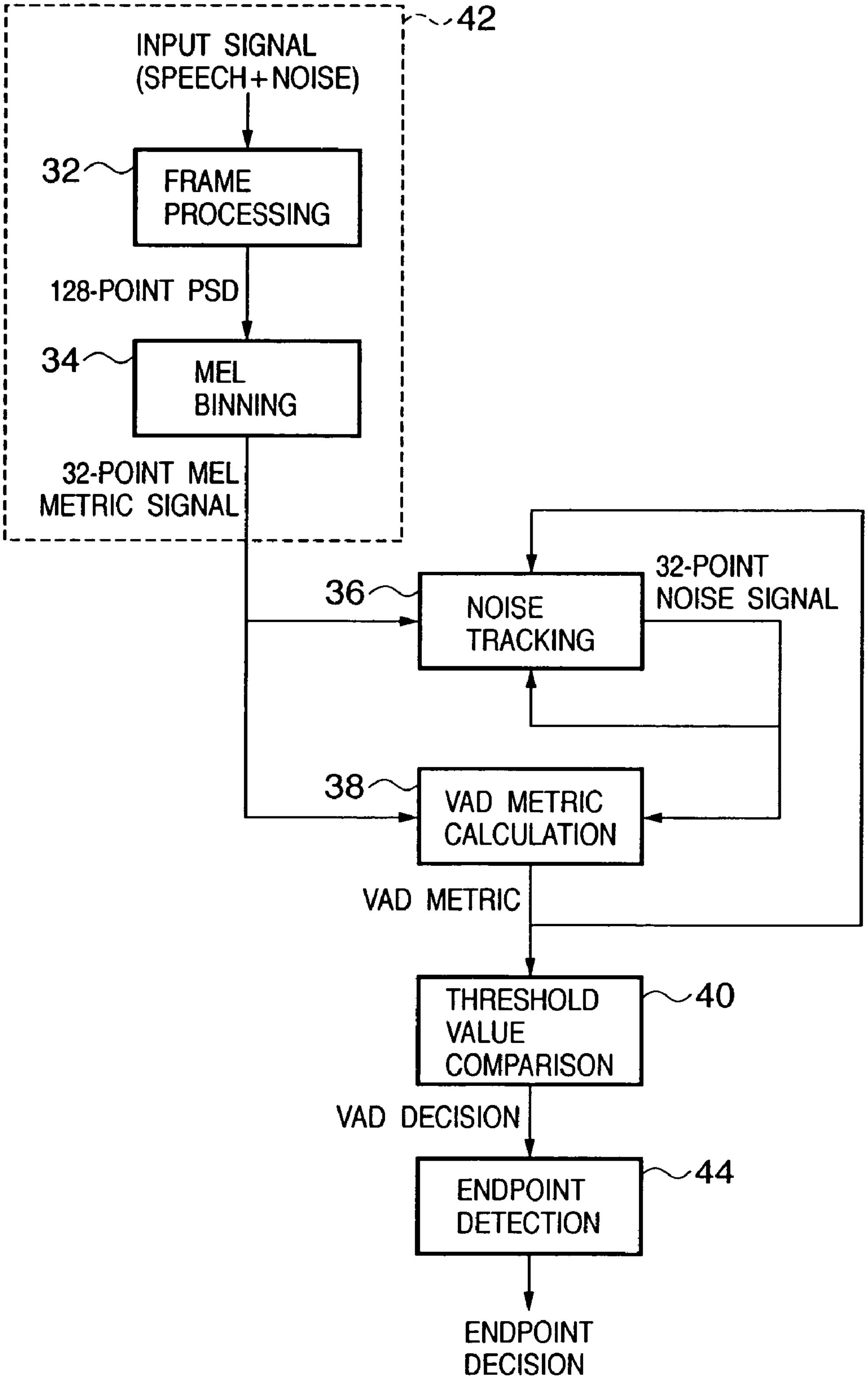
FIG. 3 is a block diagram showing the functional arrangement of an endpoint detection program according to an embodiment of the present invention.

FIG. 3 is a block diagram showing the functional arrangement of an endpoint detection program according to an embodiment.

Reference numeral 42 denotes a feature extractor that extracts a feature of an input time domain signal (for example, a speech signal with a background noise). The feature extractor 42 includes a framing module 32 that divides the input signal into frames each having a predetermined time periods, and a mel-binning module 34 that performs a mel-scale transform for the feature of the frame signal. Reference numeral 36 denotes a noise tracker that tracks a steady state of the background noise. Reference numeral 38 denotes a VAD metric calculator that calculates a VAD metric for the input signal based on the background noise tracked by the noise tracker 36. The calculated VAD metric is forwarded to a threshold value comparison module 40 as well as returned to the noise tracker 36 in order to indicate whether the present signal is speech or non-speech to the noise tracker 36. Such an arrangement allows an accurate noise tracking.

The threshold value comparison module 40 determines whether the speech is present or absent in the frame by comparing the VAD metric calculated by the VAD metric calculator 38 and a predetermined threshold value. As described later in detail, for example, the VAD metric of the speech frame is higher than that of the non-speech frame. Finally, reference numeral 44 denotes an endpoint detector that detects the starting point and the ending point of the speech based on the determination result obtained by the threshold value comparison module 40.

(Feature Extractor 42)

An acoustic signal (which can contain speech and background noise) input from the microphone 9 is sampled by the A/D converter 10 at, for example, 11.025 kHz and is divided by the framing module 32 into frames each comprising 256 samples. Each frame is generated, for example, every 110 samples. That is, adjacent frames overlap with each other. In this arrangement, 100 frames correspond to about 1 second.

Each frame undergoes a Hamming window process and then a Hartley transform process. Then, each of two outputs of the Hartley transform corresponding to the same frequency are squared and added to form the periodgram. The periodogram is also known as a PSD (Power Spectral Density). For a frame of 256 samples, the PSD has 129 bins.

As an alternative to the PSD, a zero crossing rate, magnitude, power, or spectral representations such as Fourier transform of the input signal can be used.

Each PSD is reduced in size (for example, to 32 points) by the mel-binning module 34 using a mel-band value (bin). The mel-binning module 34 transforms a linear frequency scale into a perceptual scale. Since the mel bins are formed using windows that overlap in the PSD, mel bins are highly correlated. In this embodiment, 32 mel bins are used as VAD features. In the field of speech recognition, a mel representation is generally used. Typically, the mel-spectrum is transformed into the mel-cepstrum using a logarithm operation followed by a cosine transform. The VAD, however, uses the mel representation directly. Although this embodiment uses mel-bins as features for the VAD, many other types of features can be used alternatively.

(Noise Tracker 36)

A mel metric signal is input to a noise tracker 36 and VAD metric calculator 38. The noise tracker 36 tracks the slowly changing background noise. This tracking uses the VAD metrics previously calculated by the VAD metric calculator 38.

A VAD metric will be described later. The present invention uses a likelihood ratio as the VAD metric. A likelihood ratio $L_f$ in a frame f is defined by, for example, the following equation:

$$L_f = \frac{p(s_f^2 \mid \text{speech})}{p(s_f^2 \mid \text{noise})} \tag{1}$$

where $s^2_f$ represents a vector comprising a 32-dimensional feature $\{s_1^2, s_2^2, \ldots, s_s^2\}$ measured in the frame f, the numerator represents a likelihood which indicates probability that the frame f is detected as speech, and the denominator represents a likelihood which indicates probability that the frame f is detected as noise. All expressions described in this specification can also directly use a vector $s_f=\{s_1, s_2, \ldots, s_s\}$ of a spectral magnitude as a spectral metric. In this example, the spectral metric is represented as a square, i.e., a feature vector calculated from a PSD, unless otherwise specified.

Noise tracking by the noise tracker 36 is typically represented by the following equation in the single pole filter form:

$$\mu_f=(1-\rho_\mu)S_f^2+\rho_\mu\mu_{f-1} \tag{2}$$

where $\mu_f$ represents a 32-dimensional noise estimation vector in the frame f, and $\rho_\mu$ represents the pole of a noise update filter component and is the minimum update value.

Noise tracking according to this embodiment is defined by the following equation:

$$\mu_f = \frac{1-\rho_\mu}{1+L_f}S_f^2 + \frac{\rho_\mu + L_f}{1+L_f}\mu_{f-1} \tag{3}$$

If a spectral magnitude s is used instead of a spectral power $s^2$, the likelihood ratio is represented by the following equation:

$$\mu_f = \frac{1-\rho_\mu}{1+L_f}S_f + \frac{\rho_\mu + L_f}{1+L_f}\mu_{f-1} \tag{4}$$

As described above, $L_f$ represents the likelihood ratio in the frame f. Note that if $L_f$ is close to zero, then the noise tracker 36 has the single pole filter form described above. In this case, the pole acts as a minimum tracking rate. If $L_f$ is large (much larger than 1), however, the form is much closer to the following equation:

$$\mu_f=\mu_{f-1} \tag{5}$$

As described above, noise component extraction according to this embodiment includes a process of tracking noise on the basis of the feature amount of a noise component in a previous frame and the likelihood ratio in the previous frame.

(VAD Calculator 38)

As described above, the present invention uses the likelihood ratio represented by equation (1). Three likelihood ratio calculation methods will be described below.

(1) Maximum Likelihood Method (ML)

The maximum likelihood method (ML) is represented by, e.g., the equations below. The method is also disclosed in Jongseo Sohn et al., "A Voice Activity Detector employing soft decision based noise spectrum adaptation" (Proceedings of the IEEE International Conference on Acoustics, Speech and Signal Processing, pp. 365-368, May 1998).

$$p(S_f^2 \mid \text{speech}) = \prod_{k=1}^{S} \frac{1}{\pi(\lambda_k+\mu_k)}\exp\left(-\frac{s_k^2}{\lambda_k+\mu_k}\right) \tag{6}$$

$$p(S_f^2 \mid \text{noise}) = \prod_{k=1}^{S} \frac{1}{\pi\mu_k}\exp\left(-\frac{s_k^2}{\mu_k}\right) \tag{7}$$

Figure 4:
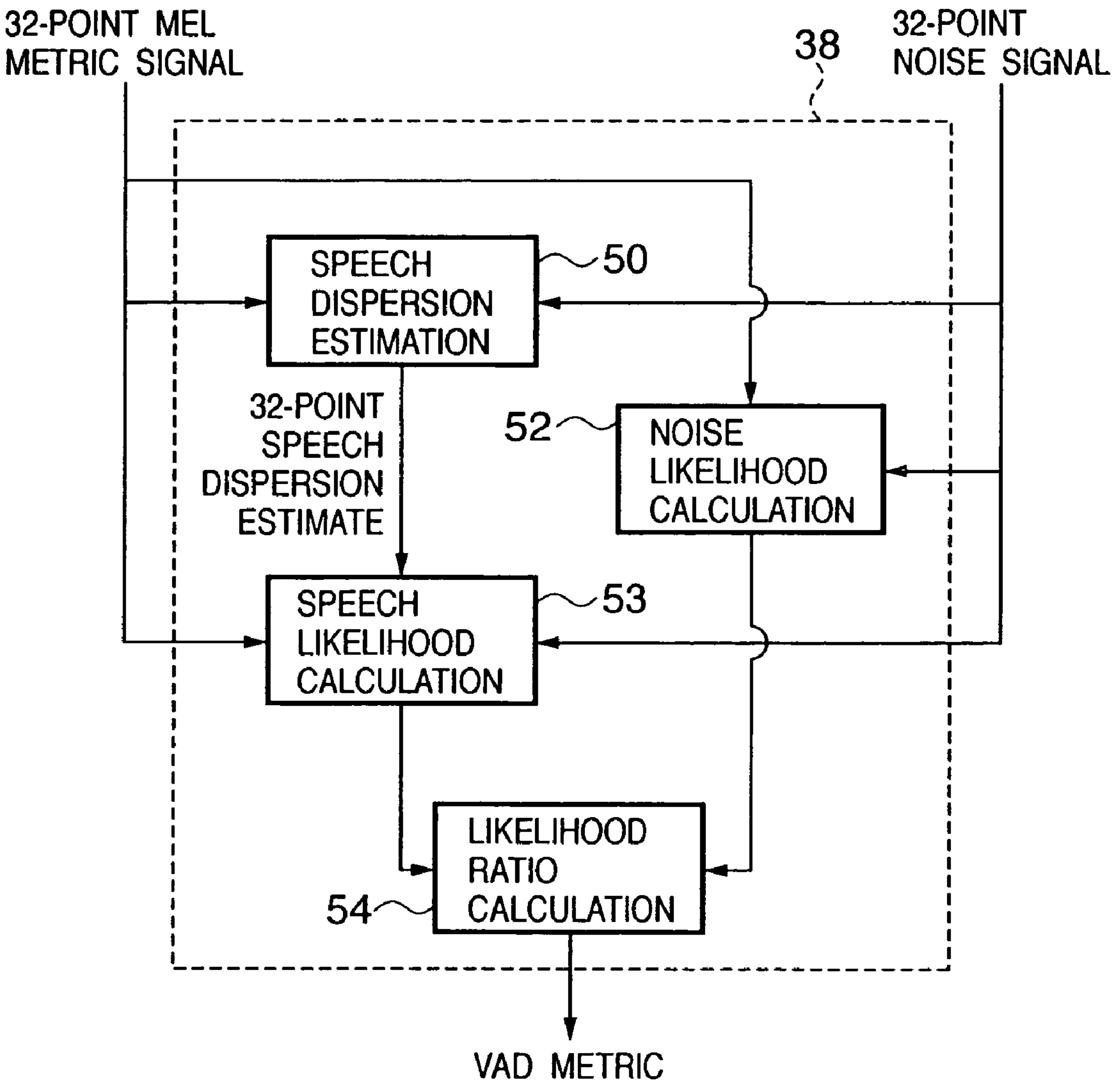
FIG. 4 is a block diagram showing a VAD metric calculation procedure using a maximum likelihood (ML) method according to an embodiment of the present invention.

Therefore, $$L_f = \prod_{k=1}^{S} \frac{\mu_k}{\lambda_k+\mu_k}\exp\left(\frac{\lambda_k}{\lambda_k+\mu_k}\cdot\frac{s_k^2}{\mu_k}\right) \tag{8}$$

where k represents an index of the feature vector, S represents the number of features (vector elements) of the feature vector (in this embodiment, 32), $\mu_k$ represents the kth element of the noise estimation vector $\mu_f$ in the frame f, $\lambda_k$ represents the kth element of a vector $\lambda_f$ (to be described later), and $s^2_k$ represents the kth element of the vector $s^2_f$. FIG. 4 shows this calculation procedure.

In VAD metric calculation using the maximum likelihood method, the value $\lambda_k$ of the kth element of the vector $\lambda_f$ needs to be calculated. The vector $\lambda_f$ is an estimate of speech variance in the frame f (standard deviation, if the spectral magnitude s is used instead of the spectral power $s^2$) In FIG. 4, the vector is obtained by speech distribution estimation 50. In this embodiment, the vector $\lambda_f$ is calculated by a spectral subtraction method represented by the following equation (9):

$$\lambda_f=\max(S_f^2-\alpha\mu_f, \beta S_f^2) \tag{9}$$

where $\alpha$ and $\beta$ are appropriate fixed values. In this embodiment, for example, $\alpha$ and $\beta$ are 1.1 and 0.3, respectively.

(2) Maximum A-posteriori Method (MAP)

Figure 5:
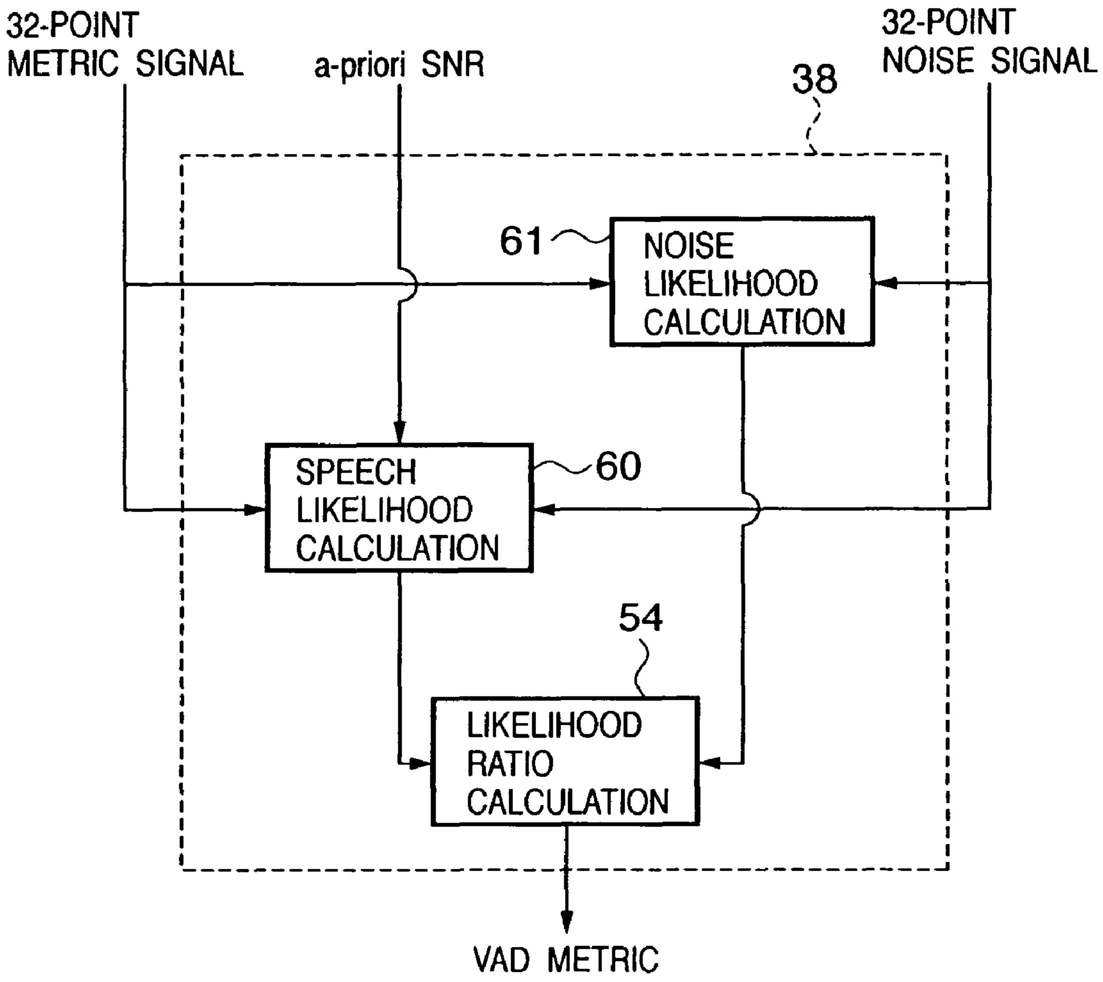
FIG. 5 is a block diagram showing a VAD metric calculation procedure using a maximum a-posteriori method according to an alternative embodiment of the present invention.

A calculation method using the maximum likelihood method (1) requires calculation of the vector $\lambda_f$. This calculation requires a spectral subtraction method or a process such as "decision directed" estimation. For this reason, the maximum a-posteriori method (MAP) can be used instead of the maximum likelihood method. A method using MAP can advantageously avoid calculation of the vector $\lambda_f$. FIG. 5 shows this calculation procedure. In this case, the noise likelihood calculation denoted by reference numeral 61 is the same as the case of the maximum likelihood method described above (noise likelihood calculation denoted by reference numeral 52 in FIG. 4). However, the speech likelihood calculation in FIG. 5 is different from that in the maximum likelihood method and is executed in accordance with the following equation (10):

$$p(S_f^2 \mid \text{speech}) = \prod_{k=1}^{S} \frac{1}{\pi\gamma(0,\omega)\mu_k\left(\frac{s_k^2}{\mu_k}+\omega\right)}\left[1-\exp\left(-\frac{s_k^2}{\mu_k}-\omega\right)\right] \tag{10}$$

where ω represents an a-priori signal-to-noise ratio (SNR) set by experimentation, and γ(*,*) represents the lower incomplete gamma function. As a result, the likelihood ratio is represented by the following equation (11):

$$L_f = \prod_{k=1}^{S} \frac{1}{e^{\omega}\gamma(0,\omega)\left(\frac{s_k^2}{\mu_k}+\omega\right)}\left[\exp\left(\frac{s_k^2}{\mu_k}+\omega\right)-1\right] \tag{11}$$

In this embodiment, ω is set to 100. The likelihood ratio is represented by the following equation (12) if the spectral magnitude s is used instead of the spectral power $s^2$:

$$L_f = \prod_{k=1}^{S} \frac{1}{e^{\omega}\gamma(0,\omega)\left(\frac{s_k}{\mu_k}+\omega\right)}\left[\exp\left(\frac{s_k}{\mu_k}+\omega\right)-1\right] \tag{12}$$

(3) Differential Feature ML Method

The above-mentioned two calculation methods are based on a method that directly uses a feature amount. As another alternative, there is available a method of performing low-pass filtering before VAD metric calculation in the feature domain (not in the time domain). A case wherein the feature amount is a spectrum has the following two advantages.

(a) It removes any overall (DC) offset. In other words, broadband noise is effectively removed. This is particularly useful for short-time broadband noises (impulses) such as the sounds made by hands clapping or hard objects hitting each other. These sounds are too fast to be tracked by the noise tracker.

(b) It removes the correlation introduced by mel binning process.

A typical low-pass filter has the following recursive relation:

$$x'_k = x_k - x_{k+1}$$

In the case of a spectrum, $x_k = s_k^2$.

In this embodiment, the filter is decimated. That is, a normal filter would produce a vector x' such that:

$$x'_1 = x_1 - x_2,$$
$$x'_2 = x_2 - x_3,$$
$$\ldots$$
$$x'_{S-1} = x_{S-1} - x_S$$

As a result, each vector has S−1 elements. The decimated filter used in this embodiment skips alternate bins, and has S/2 elements:

$$x'_1 = x_1 - x_2,$$
$$x'_2 = x_3 - x_4,$$
$$\ldots$$
$$x'_{S/2} = x_{S-1} - x_S$$

Figure 6:
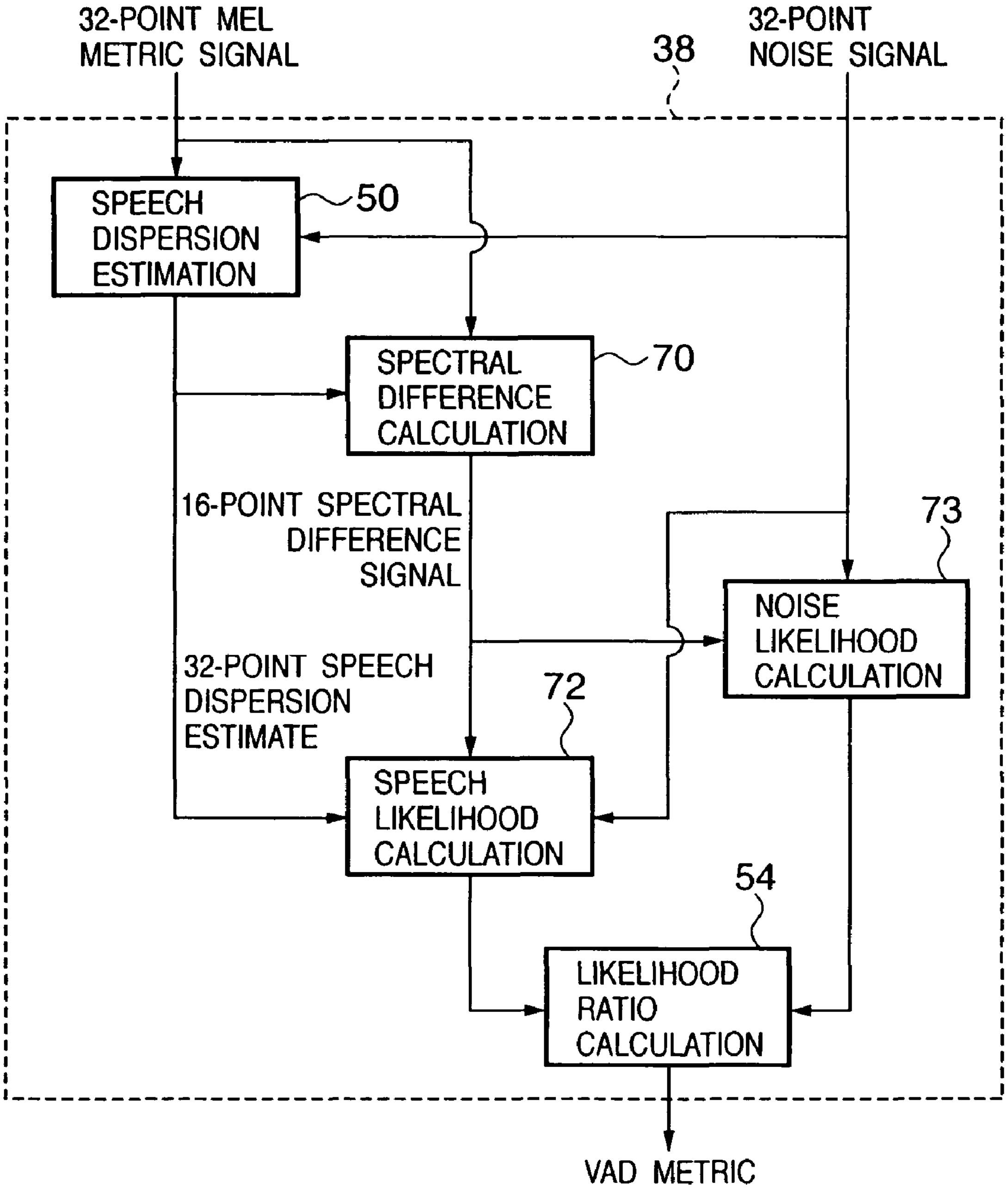
FIG. 6 is a block diagram showing a VAD metric calculation procedure using a differential feature ML method according to an alternative embodiment of the present invention.

FIG. 6 shows this calculation procedure. In this case, the ratio between a speech likelihood calculated in speech likelihood calculation 72 and a noise likelihood calculated in noise likelihood calculation 73 (likelihood ratio) depends on which spectral element is larger. More specifically, if $s^2_{2k-1} > s^2_{2k}$ holds, a speech likelihood $P(s^2_f \mid \text{speech})$ and noise likelihood $P(s^2_f \mid \text{noise})$ are respectively represented by the following equations (13) and (14):

$$p(s_f^2 \mid \text{speech}) = \prod_{k=1}^{s/2} \frac{1}{\lambda_{2k}+\mu_{2k}+\lambda_{2k-1}+\mu_{2k-1}}\exp\left(-\frac{s_{2k-1}^2 - s_{2k}^2}{\lambda_{2k-1}+\mu_{2k-1}}\right) \tag{13}$$

$$p(s_f^2 \mid \text{noise}) = \prod_{k=1}^{s/2} \frac{1}{\mu_{2k}+\mu_{2k-1}}\exp\left(-\frac{s_{2k-1}^2 - s_{2k}^2}{\mu_{2k-1}}\right) \tag{14}$$

On the other hand, if $s^2_{2k} > s^2_{2k-1}$ holds, the speech likelihood $P(s^2_f \mid \text{speech})$ and noise likelihood $P(s^2_f \mid \text{noise})$ are respectively represented by the following equations (15) and (16):

$$p(s_f^2 \mid \text{speech}) = \prod_{k=1}^{s/2} \frac{1}{\lambda_{2k}+\mu_{2k}+\lambda_{2k-1}+\mu_{2k-1}}\exp\left(-\frac{s_{2k}^2 - s_{2k-1}^2}{\lambda_{2k}+\mu_{2k}}\right) \tag{15}$$

$$p(s_f^2 \mid \text{noise}) = \prod_{k=1}^{s/2} \frac{1}{\mu_{2k}+\mu_{2k-1}}\exp\left(-\frac{s_{2k}^2 - s_{2k-1}^2}{\mu_{2k}}\right) \tag{16}$$

Therefore, the likelihood ratio is represented as follows:

$$L_f = \prod_{k=1}^{s/2} \frac{\mu_{2k}+\mu_{2k-1}}{\lambda_{2k}+\mu_{2k}+\lambda_{2k-1}+\mu_{2k-1}}\exp\left(\frac{\lambda_{2k-1}}{\lambda_{2k-1}+\mu_{2k-1}}\cdot\frac{s_{2k-1}^2 - s_{2k}^2}{\mu_{2k-1}}\right), \quad \text{if } s_{2k-1}^2 > s_{2k}^2 \tag{17}$$

$$L_f = \prod_{k=1}^{s/2} \frac{\mu_{2k}+\mu_{2k-1}}{\lambda_{2k}+\mu_{2k}+\lambda_{2k-1}+\mu_{2k-1}}\exp\left(\frac{\lambda_{2k}}{\lambda_{2k}+\mu_{2k}}\cdot\frac{s_{2k}^2 - s_{2k-1}^2}{\mu_{2k}}\right), \quad \text{if } s_{2k-1}^2 < s_{2k}^2$$

If the spectral magnitude s is used instead of the spectral power $s^2$, the likelihood ratio is represented by the following equations:

$$L_f = \prod_{k=1}^{s/2} \frac{\mu_{2k} + \mu_{2k-1}}{\lambda_{2k} + \mu_{2k} + \lambda_{2k-1} + \mu_{2k-1}} \exp\left(\frac{\lambda_{2k-1}}{\lambda_{2k-1} + \mu_{2k-1}} \cdot \frac{s_{2k-1} - s_{2k}}{\mu_{2k-1}}\right), \quad \text{if } s_{2k-1} > s_{2k} \tag{18}$$

$$L_f = \prod_{k=1}^{s/2} \frac{\mu_{2k} + \mu_{2k-1}}{\lambda_{2k} + \mu_{2k} + \lambda_{2k-1} + \mu_{2k-1}} \exp\left(\frac{\lambda_{2k}}{\lambda_{2k} + \mu_{2k}} \cdot \frac{s_{2k} - s_{2k-1}}{\mu_{2k}}\right), \quad \text{if } s_{2k-1} < s_{2k}$$

(Likelihood Matching)

The above-mentioned calculations for $L_f$ are formulated as follows:

$$L_f = \prod_{k=1}^{s} L_k \tag{19}$$

Since $L_f$ generally has various correlations, it becomes a very large value when these correlations are multiplied. For this reason, $L_k$ is raised to the power 1/(kS), as indicated in the following equation, thereby suppressing the magnitude of the value:

$$L_f = \prod_{k=1}^{s} L_k^{\frac{1}{kS}} \tag{20}$$

This equation can be represented by a logarithmic likelihood as follows:

$$\log L_f = \prod_{k=1}^{s} \frac{1}{kS} \log L_k \tag{21}$$

If kS=1, this equation corresponds to calculation of a geometric mean of likelihoods of respective elements. This embodiment uses a logarithmic form, and kS is optimized depending on the case. In this example, kS takes a value of about 0.5 to 2.

The threshold value comparison module 40 determines whether each frame is speech or on-speech by comparing the likelihood ratio as the VAD metric calculated as described above and the predetermined threshold value.

Although it is to be understood that the present invention is not limited to the above described speech/non-speech discrimination method, the above described method is a preferred embodiment for discriminating speech/non-speech for each frame. Using the likelihood ratio as the VAD metric as described above allows the VAD to be robust to the various types of background noises. Particularly, the adoption of the MAP method to the calculation for the likelihood ratio allows the easy adjustment of the VAD against the estimated signal to noise ratio. This makes it possible to detect speech at high precision even if low-level speech is mixed with high-level noise. Alternatively, the Differential feature ML method for the calculation for the likelihood ratio provides robust performance against broadband noise including footstep noise and noise caused by wind blowing or breath).

(Endpoint Detector 44)

Figure 8:
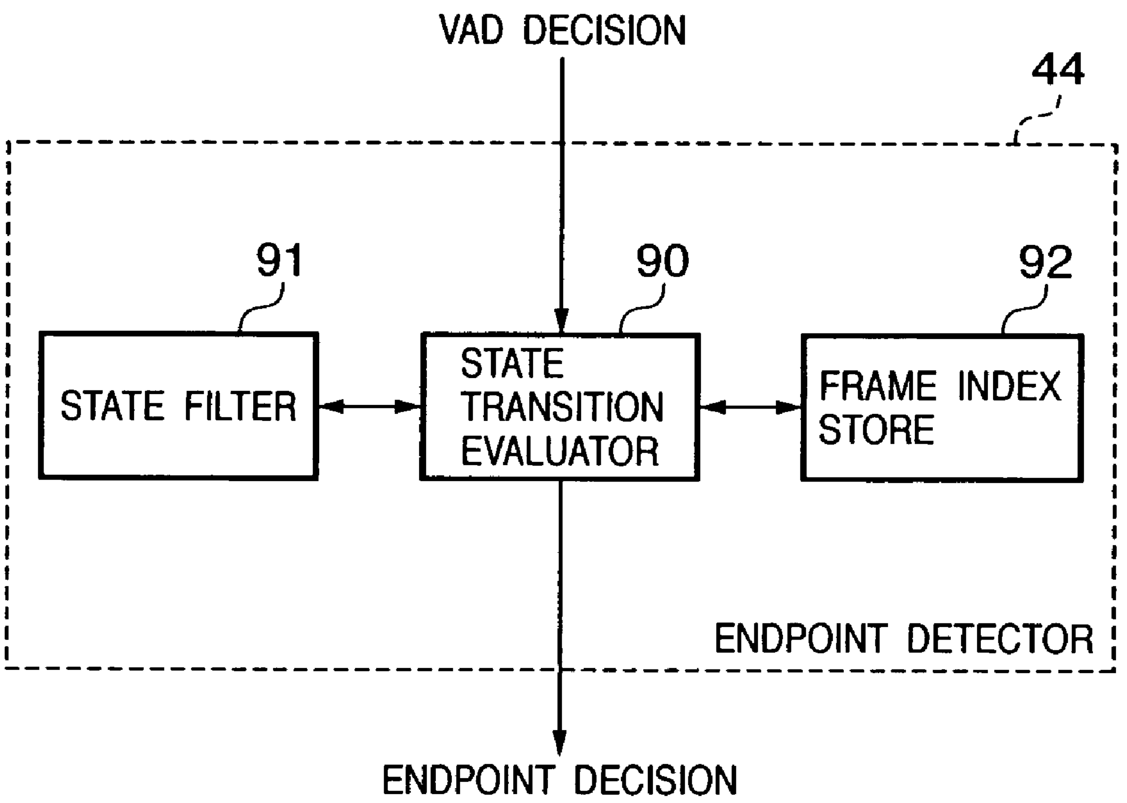
FIG. 8 is a detailed block diagram showing the functional arrangement of an endpoint detector according to an embodiment of the present invention.

FIG. 8 is a block diagram showing the detailed functional arrangement of the endpoint detector 44. As shown in FIG. 8, the endpoint detector 44 includes a state transition evaluator 90 state filter 91, and frame index store 92.

Figure 9:
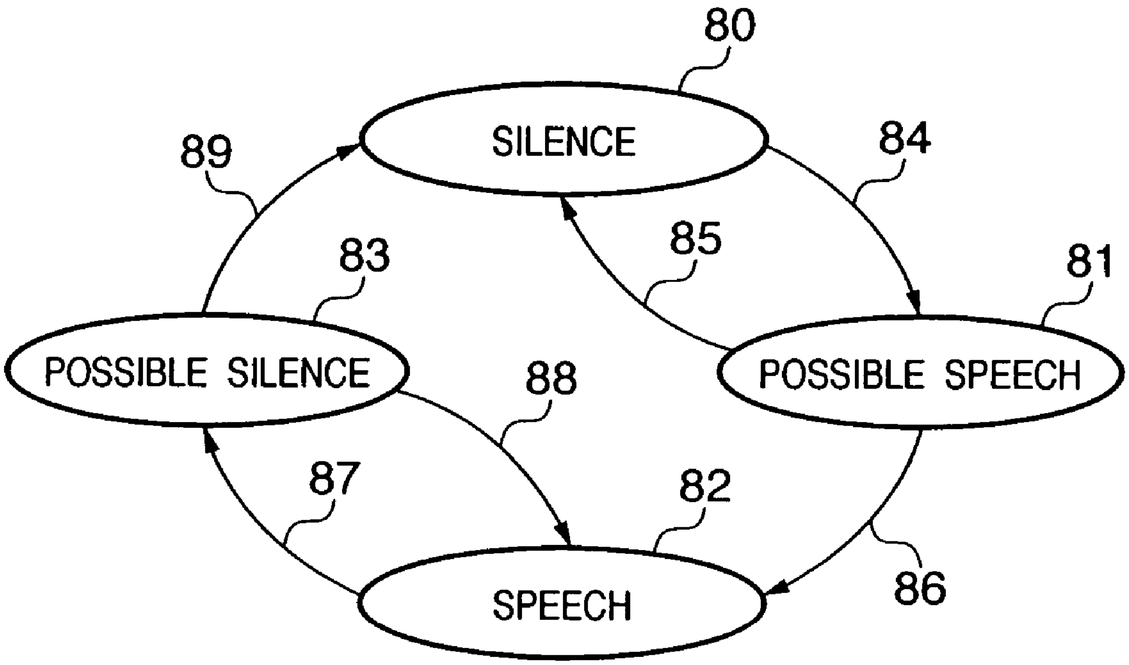
FIG. 9 is an example of a state transition diagram according to an embodiment of the present invention.

The state transition evaluator 90 evaluates a state in accordance with a state transition diagram as shown in FIG. 9, and a frame index is stored in the frame index store 92 upon occurrence of a specific state transition. As shown in FIG. 9, the states include not only a "SILENCE" 80 and a "SPEECH" 82, but also a "POSSIBLE SPEECH" 81 representing an intermediate state from the silence state to the speech state, and a "POSSIBLE SILENCE" 83 representing an intermediate state from the speech state to the silence state.

Although a state transition evaluation method performed by the state transition evaluator 90 will be described later, the evaluation result is stored in the frame index store 92 as follows. First, an initial state is set as the "SILENCE" 80 in FIG. 9. In this state, as denoted by reference numeral 84, when the state changes to the "POSSIBLE SPEECH" 81, the current frame index is stored in the frame index store 92. Then, as denoted by reference numeral 86, when the state changes from the "POSSIBLE SPEECH" 81 to the "SPEECH" 82, the stored frame index is output as the start point of speech.

Also, as denoted by reference numeral 87, when the state changes from the "SPEECH" 82 to the "POSSIBLE SILENCE" 83, the frame index in this transition is stored. Then, as denoted by reference numeral 89, when the state changes from the "POSSIBLE SILENCE" 83 to the "SILENCE", the stored frame index is output as the end point of speech.

The endpoint detector 44 evaluates the state transition on the basis of such a state transition mechanism to detect the endpoint.

The state evaluation method performed by the state transition evaluator 90 will be described below. However, before the description of the evaluation method in the present invention, the conventional state evaluation method will be described.

Conventionally, for example, when a specific state transition occurs, the number of frames determined as "speech" or "silence" by the VAD is counted. On the basis of the count value, it is determined whether the next state transition occurs. With reference to FIG. 11A-11D, this processing is concretely described. Note that the state transition mechanism shown in FIG. 9 is also used in this prior art.

Figures 11A, 11B, 11C, 11D:
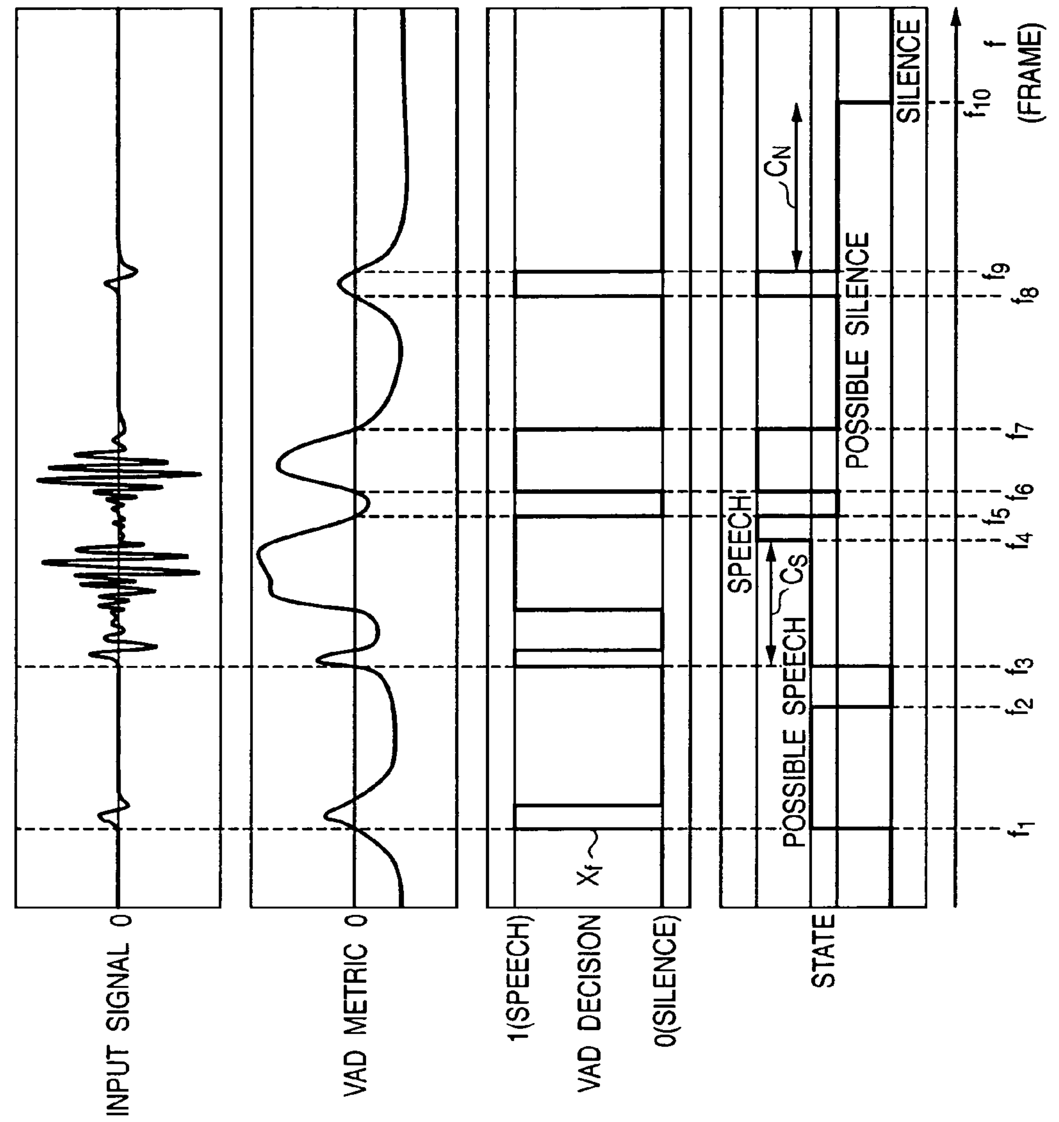
FIG. 11A shows a graph of an input signal serving as an endpoint detection target.
FIG. 11B shows a VAD metric from the VAD process for the illustrative input signal of FIG. 11A.
FIG. 11C shows the speech/silence determination result from the threshold comparison of the illustrative VAD metric in FIG. 11B.
FIG. 11D shows the result of the conventional state evaluation for the illustrative speech/silence determination result.

FIG. 11A represents an input signal serving as an endpoint detection target, FIG. 11B represents a VAD metric from the VAD process, FIG. 11C represents the speech/silence determination result from the threshold comparison of the VAD metric in FIG. 11B, and FIG. 11D represents a state evaluation result.

The state transition 84 from the "SILENCE" 80 to the "POSSIBLE SPEECH" 81 and the state transition 88 from the "POSSIBLE SILENCE" 83 to the "SPEECH" 82 immediately occur when the immediately preceding frame is determined as "silence", and the current frame is determined as "speech". Frames $f_1$, $f_3$, $f_6$, and $f_8$ in FIG. 11C are cases corresponding to the occurrence of the transition.

Similarly, the state transition 87 from the "SPEECH" 82 to the "POSSIBLE SILENCE" 83 immediately occurs when the immediately preceding frame is determined as "speech", and the current frame is determined as "silence". Frames $f_5$, $f_7$, and $f_9$ in FIG. 11C are cases corresponding to the occurrence of the transition.

On the other hand, the state transition 85 from the "POSSIBLE SPEECH" 81 to the "SILENCE" 80 or the state transition 86 from the "POSSIBLE SPEECH" 81 to the "SPEECH" 82, and the state transition 89 from the "POSSIBLE SILENCE" 83 to the "SILENCE" 80 are carefully determined. For example, the number of frames determined as "speech" is counted from the state transition such as the frame $f_1$ from the "SILENCE" 80 to the "POSSIBLE SPEECH" 81 until the predetermined number (e.g., 12) of frames is counted. If the count value reaches a predetermined value (e.g., 8) in the predetermined frames, it is determined that the state has changed to the "SPEECH" 82. In contrast to this, if the count value does not reach the predetermined value in the predetermined frames, the state returns to the "SILENCE" 80. In the frame $f_2$, the state returns to the "SILENCE" since the count value does not reach the predetermined value. At the timing of the state transition to the "SILENCE", the count value is reset.

In the frame $f_3$, the current frame is determined as "speech" in the state of the "SILENCE" 80, so that the state changes to the "POSSIBLE SPEECH" 81 again. This makes it possible to start counting the number of frames determined as "speech" by the VAD, in the predetermined frames. Then, since the count value reaches the predetermined value in the frame $f_4$, it is determined that the state has changed to the "SPEECH" in this frame. At the timing of the state transition to the "SPEECH", the count value is reset.

Also, the number of consecutive frames determined as "silence" by the VAD is counted from the state transition from the "SPEECH" 82 to the "POSSIBLE SILENCE" 83. Since the count value representing the number of consecutive frames reaches a predetermined value (e.g., 10), it is determined that the state has changed to the "SILENCE" 80. Note that when the frame determined as "speech" by the VAD is detected before the above count value reaches the predetermined value, the state returns to the "SPEECH" 82. Since the state has changed to the "SPEECH", the count value is reset at this timing.

The conventional state evaluation method has been described above. The defect of this scheme appears in periods between the frames $f_8$ and $f_{10}$ and between $f_3$ and $f_4$. For example, as in the frame $f_8$, the state changes to the "SPEECH" 82 because of sudden or isolated speech, and immediately returns to the "POSSIBLE SILENCE" 83 in the frame $f_9$. Since the count value is reset in this period, the number of consecutive frames determined as "silence" by the VAD is to be counted again. Hence, the determination that the state has changed to the "SILENCE" 80 is delayed ($f_9$ and $f_{10}$). Also, in the period between the frames $f_3$ and $f_4$, as described above, the process of counting the number of frames determined as "speech" by the VAD is started from the frame $f_3$. When the count value reaches the fixed value, it is determined that the state has changed to the "SPEECH" 82. Therefore, in most cases, the determination is actually delayed.

In contrast to this, in the present invention, the frame state is evaluated on the basis of the threshold comparison of the filter outputs from the state filter 91. The process according to this embodiment will be concretely described below.

Figures 10A, 10B, 10C, 10D, 10E:
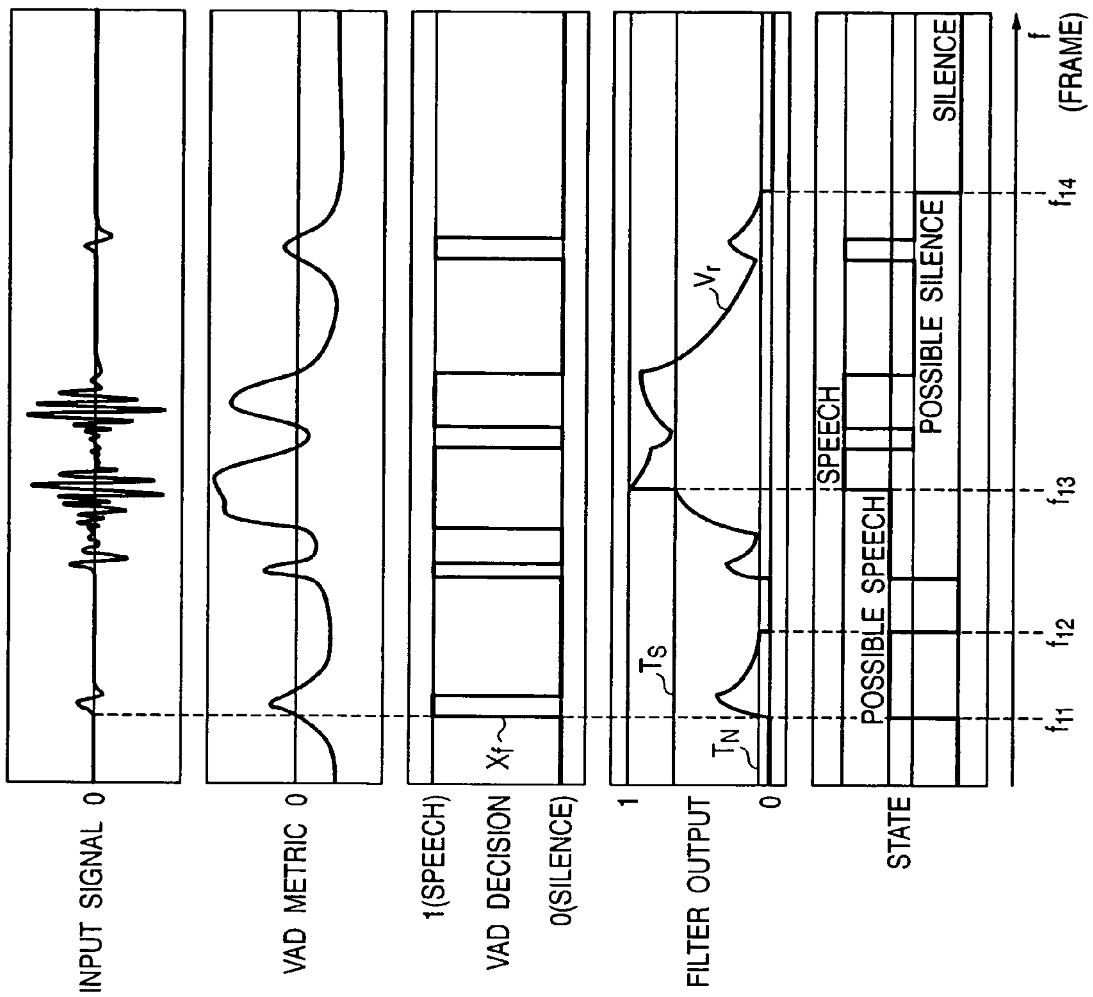
FIG. 10A shows a graph of an input signal serving as an endpoint detection target.
FIG. 10B shows a VAD metric from the VAD process for the illustrative input signal of FIG. 10A.
FIG. 10C shows the speech/silence determination result from the threshold comparison of the illustrative VAD metric in FIG. 10B.
FIG. 10D shows the state filter output according to an embodiment of the present invention.
FIG. 10E shows the result of the endpoint detection for the illustrative speech/silence determination result according to an embodiment of the present invention.

The speech/silence determination result is input from the threshold value comparison module 40 to the endpoint detector 44. Assume that "speech" and "silence" of the determination result are set to 1 and 0, respectively. The determination result of the current frame input from the threshold value comparison module 40 undergoes a filter process by the state filter 91 as follows $$V_f=\rho V_{f-1}+(1-\rho)X_f$$

where f represents a frame index, $V_f$ represents the filter output of a frame f, $X_f$ represents the filter input of the frame f (i.e., the speech/silence determination result of the frame f), and ρ represents the constant value as the extreme value of the filter. The ρ serving as the pole of the filter defines the filter response. In this embodiment, typically, this value is set to 0.99, and the initial value of the filter output $V_f$ is set to 0 ($V_f=0$). As can be apparent from the above equation, this filter has a format that the filter output is returned to the filter input, and this filter outputs the weighted sum of the filter output $V_{f-1}$ of the immediately preceding frame and the new input $X_f$ (speech/silence determination result) of the current frame. It is to be understood that this filter smoothes the binary (speech/silence) determination information of the current frame by using the binary (speech/silence) determination information of the preceding frame. Alternatively, this filter may output the weighted sum of the filter output of the two or more preceding frames and the speech/silence determination result of the current frame. FIG. 10D shows this filter output. Note that FIGS. 10A to 10C are same as FIGS. 11A to 11C.

In this embodiment, the state is evaluated by the state transition evaluator 90 as follows. Assume that the current state starts from the "SILENCE" 80. In this state, generally, the speech/silence determination result from the threshold value comparison module 40 is set as "silence". In this state, the state transition 84 to the "POSSIBLE SPEECH" 81 occurs by determining the state of the current frame as "speech" using the threshold value comparison module 40 (e.g., the frame $f_{11}$ in FIG. 10C). This is the same as the above-described prior art.

Next, the transition 86 from the "POSSIBLE SPEECH" 81 to the "SPEECH" 82 occurs when the filter output from the state filter 91 exceeds a first threshold value $T_S$ (the frame $f_{13}$ in FIG. 10D). On the other hand, the transition 85 from the "POSSIBLE SPEECH" 81 to the "SILENCE" 80 occurs when the filter output from the state filter 91 is below a second threshold value $T_N$ ($T_N<T_S$) (the frame $f_{12}$ in FIG. 10D). In this embodiment, $T_S=0.5$, and $T_N=0.075$.

When the state changes from speech to silence, the state is determined as follows. In the "SPEECH" 82, the speech/silence evaluation result from the threshold value comparison module 40 is generally set as "speech". In this state, the state transition 87 to the "POSSIBLE SILENCE" 83 immediately occurs since the current frame is determined as "silence" by the threshold value comparison module 40.

The transition 89 from the "POSSIBLE SILENCE" 83 to the "SILENCE" 80 occurs when the filter output from the state filter 91 is below the second threshold value $T_N$ (the frame $f_{14}$ in FIG. 10D). On the other hand, the transition 88 from the "POSSIBLE SILENCE" 83 to the "SPEECH" 82 immediately occurs since the current frame is determined as "speech" by the threshold value comparison module 40.

The state transition evaluator 90 controls the filter output $V_f$ from the state filter 91 as follows. When the state changes from the "POSSIBLE SPEECH" 81 to the "SPEECH" 82, the filter output $V_f$ is set to 1 (with reference to the frame $f_{13}$ in FIG. 10D). On the other hand, when the state changes from the "POSSIBLE SILENCE" 83 to the "SILENCE" 80, the filter output $V_f$ is set to 0 (with reference to the frames $f_{12}$ and $f_{14}$ in FIG. 10D).

As described above, in this embodiment, the state filter 91 which smooths the frame state (speech/silence determination result) is introduced to evaluate the frame state on the basis of the threshold value determination for the output from this state filter 91. In this embodiment, the state is determined as "SPEECH" when the output from the state filter 91 exceeds the first threshold value $T_S$, or as "SILENCE" when the output from the state filter 91 is below the second threshold value $T_N$. Accordingly, in this embodiment, in contrast to the prior art, the state transition is not determined in accordance with whether the count value reaches the predetermined value upon counting the number of the frames determined as "speech" or "silence" by the VAD. Hence, the delay of the state transition determination can be greatly reduced, and the endpoint detection can be executed with high precision.

(Details of Endpoint Detection Algorithm)

Figure 7:
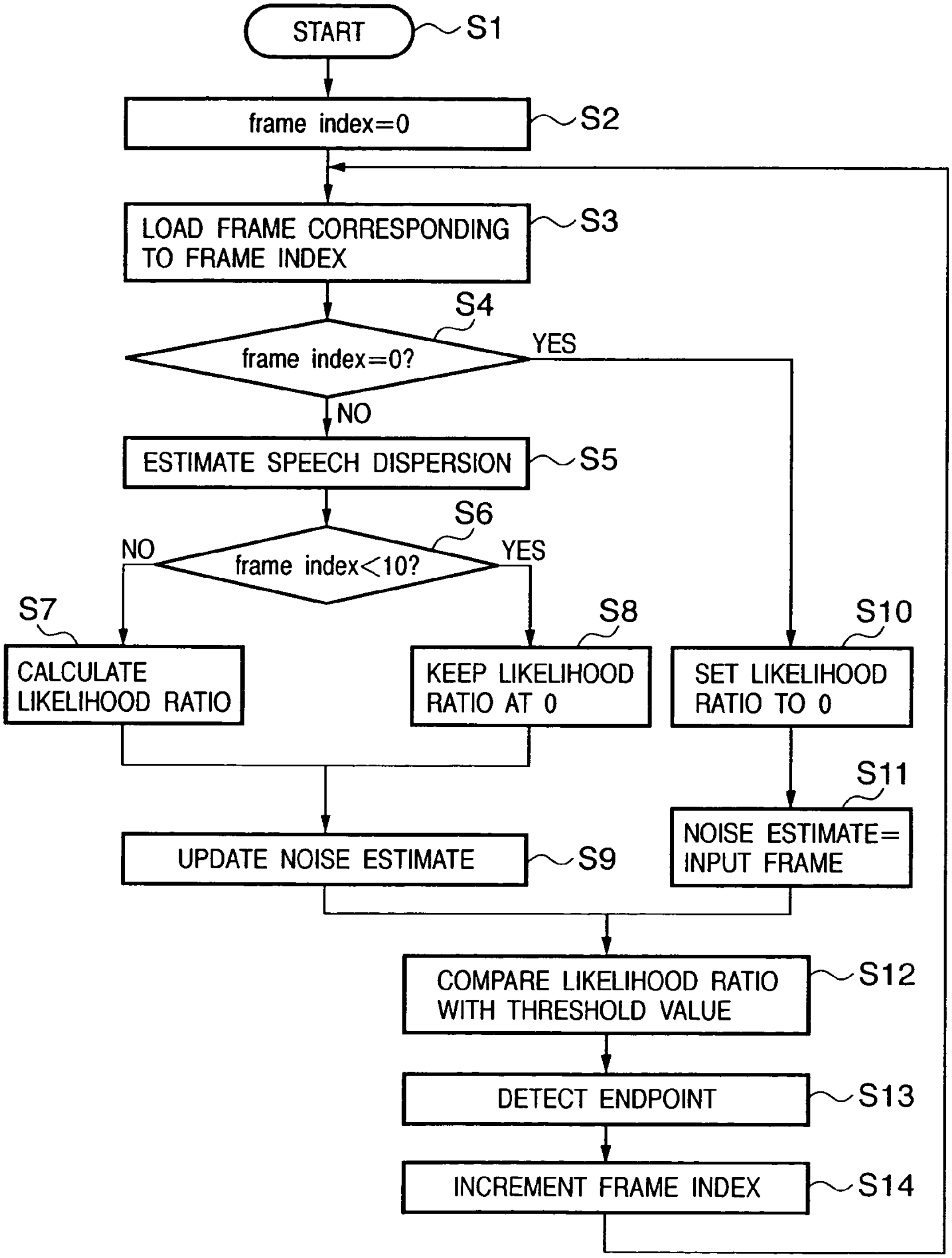
FIG. 7 is a flowchart of the signal detection process according to an embodiment of the present invention.

FIG. 7 is a flowchart showing the signal detection process according to this embodiment. A program corresponding to this flowchart is included in the VAD program stored in the HDD 4. The program is loaded onto the RAM 3 and is then executed by the CPU 1.

The process starts in step S1 as the initial step. In step S2, a frame index is set to 0. In step S3, a frame corresponding to the current frame index is loaded.

In step S4, it is determined whether the frame index is 0 (initial frame). If the frame index is 0, the process advances to step S10 to set the likelihood ratio serving as the VAD metric to 0. Then, in step S11, the value of the initial frame is set to a noise estimate, and the process advances to step S12.

On the other hand, if it is determined in step S4 that the frame index is not 0, the process advances to step S5 to execute speech variance estimation in the above-mentioned manner. In step S6, it is determined whether the frame index is less than a predetermined value (e.g., 10). If the frame index is less than 10, the flow advances to step S8 to keep the likelihood ratio at 0. On the other hand, if the frame index is equal to or more than the predetermined value, the process advances to step S7 to calculate the likelihood ratio serving as the VAD metric. In step S9, noise estimation is updated using the likelihood ratio determined in step S7 or S8. With this process, noise estimation can be assumed to be a reliable value.

In step S12, the likelihood ratio is compared with a predetermined threshold value to generate binary data (value indicating speech or non-speech). If MAP is used, the threshold value is, e.g., 0; otherwise, e.g., 2.5.

In step S13, the speech endpoint detection is executed on the basis of a result of the comparison in step S12 between the likelihood ratio and the threshold value.

In step S14, the frame index is incremented, and the process returns to step S3. The process is repeated for the next frame.

Other Embodiments

Although the above embodiment is described in terms of speech, the present invention is applicable to audio signals or acoustic signals other than speech, such as animal sounds or those of machinery. It is also applicable to acoustic signals not in the normal audible range of a human being, such as sonar or animal sounds. The present invention also applies to electromagnetic signals such as radar or radio signals.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user's computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-093166 filed Mar. 26, 2004, which is hereby incorporated by reference herein.

What is claimed is:

1. A speech signal processing apparatus comprising:

a dividing unit which divides an input speech signal into frames, each of which has a predetermined time length;

a calculation unit which calculates a VAD metric for a current frame;

a determination unit which determines whether a signal in the current frame contains speech or non-speech by using the VAD metric and outputs a VAD flag of 1 or 0 indicating whether the current frame contains speech or non-speech, respectively;

a filter unit which smooths the VAD flags output from said determination unit, wherein said filter unit executes a filter process expressed as follows:

$$V_f=\rho V_{f-1}+(1-\rho)X_f,$$

where:

f is a frame index;

$V_f$ is the filter output of the frame f;

$X_f$ is the filter input of the frame f, which is the VAD flag of the frame f; and ρ is a constant value as a pole of the filter; and a state evaluation unit which, according to the output from said filter unit, $V_f$, evaluates a current state of the speech signal from among a silence state, a speech state, a possible speech state representing an intermediate state from the silence state to the speech state, and a possible silence state representing an intermediate state from the speech state to the silence state, wherein said state evaluation unit performs the following operations:

in the silence state, when the VAD flag becomes 1, the state moves to the possible speech state, in the possible speech state, when $V_f$ exceeds a first threshold value, the state moves to the speech state and $V_f$ is set to 1, and when $V_f$ is below a second threshold value that is smaller that the first threshold value, the state moves to the silence state, in the speech state, when the VAD flag becomes 0, the state moves to the possible silence state, and in the possible silence state, when $V_f$ is below the second threshold value, the state moves to the silence state and $V_f$ is set to 0, and when the VAD flag becomes 1, the state moves to the speech state.

2. A speech signal processing method comprising the steps of:

(a) dividing an input speech signal into frames, each of which has a predetermined time length;

(b) calculating a VAD metric for a current frame;

(c) determining whether a signal in the current frame contains speech or non-speech by using the VAD metric and outputting a VAD flag of 1 or 0 indicating whether the current frame contains speech or non-speech, respectively;

(d) smoothing the VAD flags output from said determination step, wherein said smoothing step executes a filter process expressed as follows:

$$V_f=\rho V_{f-1}+(1-\rho)X_f,$$

where:

f is a frame index;

$V_f$ is the filter output of the frame f;

$X_f$ is the filter input of the frame f, which is the VAD flag of the frame f; and ρ is a constant value as a pole of the filter; and (e) evaluating, according to the output of said smoothing step, $V_f$, a current state of the speech signal from among a silence state, a speech state, a possible speech state representing an intermediate state from the silence state to the speech state, and a possible silence state representing an intermediate state from the speech state to the silence state, wherein said evaluating step performs the following operations:

in the silence state, when the VAD flag becomes 1, the state moves to the possible speech state, in the possible speech state, when $V_f$ exceeds a first threshold value, the state moves to the speech state and $V_f$ is set to 1, and when $V_f$ is below a second threshold value that is smaller that the first threshold value, the state moves to the silence state, in the speech state, when the VAD flag becomes 0, the state moves to the possible silence state, and in the possible silence state, when $V_f$ is below the second threshold value, the state moves to the silence state and $V_f$ is set to 0, and when the VAD flag becomes 1, the state moves to the speech state.

3. A computer-readable medium storing program code for causing a computer to perform the steps of:

(a) dividing an input speech signal sequence into frames, each of which has a predetermined time length;

(b) calculating a VAD metric for a current frame;

(c) determining whether a signal in the current frame contains speech or non-speech by using the VAD metric and outputting a VAD flag of 1 or 0 indicating whether the current frame contains speech or non-speech, respectively;

(d) smoothing the VAD flags output from said determination step, wherein said smoothing step executes a filter process expressed as follows:

$$V_f=\rho V_{f-1}+(1-\rho)X_f,$$

where:

f is a frame index;

$V_f$ is the filter output of the frame f;

$X_f$ is the filter input of the frame f, which is the VAD flag of the frame f; and ρ is a constant value as a pole of the filter; and (e) evaluating, according to the output of said smoothing step, $V_f$, a current state of the speech signal from among a silence state, a speech state, a possible speech state representing an intermediate state from the silence state to the speech state, and a possible silence state representing an intermediate state from the speech state to the silence state, wherein said evaluating step performs the following operations:

in the silence state, when the VAD flag becomes 1, the state moves to the possible speech state, in the possible speech state, when $V_f$ exceeds a first threshold value, the state moves to the speech state and $V_f$ is set to 1, and when $V_f$ is below a second threshold value that is smaller that the first threshold value, the state moves to the silence state, in the speech state, when the VAD flag becomes 0, the state moves to the possible silence state, and in the possible silence state, when $V_f$ is below the second threshold value, the state moves to the silence state and $V_f$ is set to 0, and when the VAD flag becomes 1, the state moves to the speech state.

* * * * *